United States Patent
Liao et al.

(10) Patent No.: US 12,139,366 B1
(45) Date of Patent: Nov. 12, 2024

(54) ROTARY SHAFT OF THREE-DIMENSIONAL PRINTING FILAMENT SPOOL HOLDER, THREE-DIMENSIONAL PRINTING FILAMENT SPOOL HOLDER, AND THREE-DIMENSIONAL PRINTER

(71) Applicant: SHENZHEN TUOZHU TECHNOLOGY CO., LTD., Shenzhen (CN)

(72) Inventors: Ran Liao, Shenzhen (CN); Zezheng Zhang, Shenzhen (CN); Yinan Cai, Shenzhen (CN)

(73) Assignee: SHENZHEN TUOZHU TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/599,153

(22) Filed: Mar. 7, 2024

(30) Foreign Application Priority Data

Aug. 25, 2023 (CN) .......................... 202311086585.9

(51) Int. Cl.
  *B65H 75/18*  (2006.01)
  *B29C 64/118*  (2017.01)
  *B29C 64/321*  (2017.01)
  *B33Y 30/00*  (2015.01)

(52) U.S. Cl.
  CPC ............ *B65H 75/18* (2013.01); *B29C 64/118* (2017.08); *B29C 64/321* (2017.08); *B33Y 30/00* (2014.12)

(58) Field of Classification Search
  CPC ..... B29C 64/118; B29C 64/321; B65H 49/26; B65H 49/34; B65H 75/245; B65H 75/2455; B65H 75/30; B65H 75/486
  USPC ....................................................... 242/129.3
  See application file for complete search history.

(56) References Cited

U.S. PATENT DOCUMENTS

| | | | |
|---|---|---|---|
| 4,462,551 A * | 7/1984 | Bloch | A01K 97/26 |
| | | | 242/129.3 |
| 9,862,178 B2 * | 1/2018 | Lee | B29C 64/118 |

* cited by examiner

*Primary Examiner* — William A. Rivera
(74) *Attorney, Agent, or Firm* — KILPATRICK TOWNSEND & STOCKTON LLP (57) ABSTRACT

Provided are a rotary shaft of a three-dimensional printing filament spool holder, a three-dimensional printing filament spool holder, and a three-dimensional printer, comprising a fixed tube and a sleeve assembly sleeved outside the fixed tube and being capable of rotating relative to the fixed tube. The sleeve assembly is elastically connected to the fixed tube through an elastic member, the relative rotation between the sleeve assembly and the fixed tube causes the elastic member to generate elastic deformation, and the sleeve assembly is configured for being sleeved in a three-dimensional printing filament spool.

21 Claims, 6 Drawing Sheets

ROTARY SHAFT OF THREE-DIMENSIONAL PRINTING FILAMENT SPOOL HOLDER, THREE-DIMENSIONAL PRINTING FILAMENT SPOOL HOLDER, AND THREE-DIMENSIONAL PRINTER

CROSS-REFERENCE TO RELATED APPLICATIONS

This application claims priority to Chinese Patent Application No. CN 202311086585.9, filed on Aug. 25, 2023, the contents of which are hereby incorporated by reference in their entirety for all purpose.

TECHNICAL FIELD

The present application relates to the field of three-dimensional printing technology, and in particular to a rotary shaft of a three-dimensional printing filament spool holder, a three-dimensional printing filament spool holder, and a three-dimensional printer.

BACKGROUND

A 3D printer, also known as a three-dimensional printer or an additive manufacturing device, is a process equipment for rapid prototyping. The 3D printing technology that can be currently adopted by a 3D printer is fused deposition modeling (FDM). FDM is a technology based on digital models for constructing three-dimensional objects using materials like powdered metal or plastic through layer-by-layer printing. In a specific implementation, the three-dimensional printer adopting the FDM technology supplies hot melt filamentary materials to a nozzle by a filament supply mechanism, and the hot melt filamentary materials are heated to a molten state in the nozzle. The nozzle can extrude the material in a molten state to the printing panel while moving along the printing path of the three-dimensional printer, and a three-dimensional object can be printed layer by layer.

A 3D printer usually has a filament spool holder. The filament spool holder may comprise a cylinder, and the cylinder is sleeved in the filament spool hole of the 3D printing filament spool. The filament spool is wound with a 3D printing filament. The filament can be sent into the 3D printer when printing, but when the filament need be returned from the 3D printer, the returned filament cannot be tightly wound around on the filament spool, and the returned filament even can be wound outside the filament spool, thereby affecting the subsequent feeding.

SUMMARY

In view of the above problems, the present application has been made to provide a three-dimensional printing rotary filament spool holder shaft, a rotary shaft of a three-dimensional printing filament spool holder, and a three-dimensional printer that overcome or at least partially solve the above problems.

In a first aspect of the present application, the present application discloses a rotary shaft of a three-dimensional printing filament spool holder, comprising:
a fixed tube;
a sleeve assembly, wherein the sleeve assembly is sleeved outside the fixed tube and is capable of rotating relative to the fixed tube, the sleeve assembly is elastically connected to the fixed tube through an elastic member, the relative rotation between the sleeve assembly and the fixed tube causes the elastic member to generate elastic deformation, and the sleeve assembly is configured for being sleeved in a three-dimensional printing filament spool.

Optionally, the sleeve assembly comprises:
an inner cylinder assembly, wherein the sleeve assembly is sleeved outside the fixed tube and is capable of rotating relative to the fixed tube, the inner cylinder assembly is elastically connected to the fixed tube through the elastic member, and the relative rotation between the inner cylinder assembly and the fixed tube causes the elastic member to generate elastic deformation;
an outer cylinder assembly, wherein the outer cylinder assembly is sleeved outside the inner cylinder assembly and is configured for being sleeved in the three-dimensional printing filament spool; the outer cylinder assembly is capable of rotating relative to the inner cylinder assembly, and the outer cylinder assembly and the inner cylinder assembly abut against each other through an abutting member to generate a frictional force for hindering the outer cylinder assembly to rotate relative to the inner cylinder assembly.

Optionally, a limit structure is included between the fixed tube and the inner cylinder assembly, and the limit structure is configured for limiting the rotation angle of the inner cylinder assembly relative to the fixed tube.

Optionally, a plug is connected to one end of the fixed tube, and the limit structure is included between the plug and the inner cylinder assembly.

Optionally, the elastic member comprises a torsion spring, and the sleeve assembly is elastically connected to the fixed tube through the elastic member comprises: a first torsion arm of the torsion spring is connected to the inner cylinder assembly, and the body and a second torsion arm of the torsion spring are connected to the plug.

Optionally, the elastic member comprises a coil spring, and the sleeve assembly is elastically connected to the fixed tube through the elastic member comprises: the inner side of the coil spring is connected to the plug, and the outer side of the coil spring is connected to the plug.

Optionally, the fixed tube is in interference fit with the plug, or the fixed tube and the plug are in a fit relationship of mutually limiting rotation and mutually limiting axial movement; the fixed tube is in clearance fit with the inner cylinder assembly, and the inner cylinder assembly is in clearance fit with the outer cylinder assembly.

Optionally, the rotary shaft of the three-dimensional printing filament spool holder further comprises a bottom plate connected to one end of the outer cylinder assembly, the abutting member is arranged on the bottom plate, the outer cylinder assembly abuts against one end of the inner cylinder assembly, and the abutting member abuts against the other end of the inner cylinder assembly.

Optionally, the abutting member comprises an elastic sheet, a spring sheet, a leaf spring, or a pressure spring.

Optionally, the elastic member comprises a coil spring or a torsion spring.

Optionally, further included are:
at least two elastic supporting arms separately elastically mounted at the outer edge of the sleeve assembly through an elastic arm, wherein when the elastic arm is in a natural state, the elastic supporting arm forms a preset included angle relative to the axial direction of the sleeve assembly, so that the distance between first ends of the at least two elastic supporting arms is closer relative to the distance between second ends of the at least two elastic supporting arms, and the at least two of the elastic supporting arms extend along the axial direction of the sleeve assembly, and are evenly distributed at the outer edge of the sleeve assembly along the circumferential direction of the sleeve assembly, wherein the sleeve assembly is sleeved outside a first end of the fixed tube, and a second end is the other end of the first end.

Optionally, at least two accommodation slots extend along the axial direction of the sleeve assembly and are distributed along the circumferential direction of the sleeve assembly, and the at least two supporting arms are separately mounted in the at least two accommodation slots; when the elastic arm is in a compressed state, the at least two elastic supporting arms are attached to the sleeve assembly.

Optionally, a mounting hole is formed in the accommodation slot, the elastic arm comprises a leaf spring, the leaf spring has two elastic plates bent at the middle area of the leaf spring, the elastic deformation of the leaf spring is a change in the included angle between the two elastic plates, the leaf spring is provided with a middle hole in the middle area, and the leaf spring penetrates through the middle hole through a first connecting shaft to connect with the mounting hole and the accommodation slot.

Optionally, the elastic supporting arm is provided with a round hole at one side close to the first end of the elastic supporting arm, a long round rail hole is arranged at one side distal to the first end of the elastic supporting arm, and the axial direction of the long round rail hole is parallel to the direction from the first end of the elastic supporting arm to the second end of the elastic supporting arm;

two ends of the leaf spring are provided with a side hole, the round hole is pivotally connected to one of the side holes through a second connecting shaft, a third connecting shaft passes through the rail hole and the other of the side holes, and the third connecting shaft is capable of sliding within the long round rail hole along the axial direction of the long round rail hole to change the included angle between the two elastic plates.

Optionally, further included is:

an anti-slip member arranged on the outer surface of the elastic supporting arm.

Optionally, the opening of the first end of the fixed tube has a first shape, the opening of the second end of the fixed tube has a second shape, and the sleeve assembly comprises a first sleeve assembly sleeved outside the first end and a second sleeve assembly sleeved outside the second end;

the first sleeve assembly is elastically connected to the fixed tube through a first elastic member, the relative rotation between the sleeve assembly and the fixed tube causes the first elastic member to generate elastic deformation in a first direction, the first sleeve assembly has a fool-proof structure of a first shape, and the fool-proof structure of the first shape is configured for being detachably connected to the first end for the first sleeve assembly to be detachably connected to the first end;

the second sleeve assembly is elastically connected to the fixed tube through a second elastic member, the relative rotation between the sleeve assembly and the fixed tube causes the second elastic member to generate elastic deformation in a second direction, the second sleeve assembly has a fool-proof structure of a second shape, and the fool-proof structure of the second shape is configured for being detachably connected to the second end for the second sleeve assembly to be detachably connected to the second end.

Optionally, the fool-proof structure of the first shape comprises: a plug of the first shape; the fool-proof structure of the second shape comprises a plug of the second shape.

Optionally, the first direction is a clockwise direction; the second direction is a counterclockwise direction.

In a second aspect of the present application, the present application discloses a three-dimensional printing filament spool holder, comprising:

a filament spool holder body;
the rotary shaft of the three-dimensional printing filament spool holder described above, wherein the fixed tube of the rotary shaft of the three-dimensional printing filament spool holder is connected to the filament spool holder body.

In a third aspect of the present application, the present application discloses a three-dimensional printing filament spool holder, comprising: a filament spool holder body; a fixed tube rotatably connected to the filament spool holder body and elastically connected to the filament spool holder body through an elastic member, wherein the relative rotation between the fixed tube and the filament spool holder body causes the elastic member to generate elastic deformation; a sleeve assembly configured for being sleeved in a three-dimensional printing filament spool and capable of rotating relative to the fixed tube, wherein the sleeve assembly is configured for being sleeved in the three-dimensional printing filament spool.

Optionally, the three-dimensional printing filament spool holder further comprises: an abutting member, wherein the sleeve assembly and the fixed tube abut against each other through the abutting member to generate a frictional force for hindering the sleeve assembly to rotate relative to the fixed tube.

In a fourth aspect of the present application, the present application discloses a three-dimensional printer comprising: the rotary shaft of the three-dimensional printing filament spool holder described above, wherein one end, distal to the sleeve assembly, of the fixed tube is connected to a frame of the three-dimensional printer.

In a fifth aspect of the present application, the present application discloses a three-dimensional printer and the three-dimensional printer filament spool holder described above, wherein the filament spool holder body is connected to a frame of the three-dimensional printer.

The present application comprises the following advantages:

According to the present application, through the elastic deformation generated by the relative rotation between the sleeve assembly and the fixed tube, during feeding the filament, the filament pulls the filament spool to rotate, the sleeve assembly is driven to rotate along with the filament spool, and relative rotation between the sleeve assembly and the fixed tube causes the elastic member to generate elastic deformation; during retracting the filament, the filament is released back to the filament spool, the elastic deformation of the elastic member starts to recover, the resilience force is released, the sleeve assembly is made to rotate reversely to drive the filament spool to rotate reversely, so that the returned filament can be wound on the filament spool again, and the returned filament is prevented from loosening; moreover, an additional complex driving structure is not required to be added, so that the structure of the rotary shaft of the three-dimensional printing filament spool holder is simple.

Description of the reference numerals: 100—fixed tube, 200—sleeve assembly, 210—inner cylinder assembly, 220—outer cylinder assembly, 300—elastic member, 400—abutting member, 500—plug, 600—bottom plate, 700—friction assembly, 800—elastic supporting arm, 810—elastic arm, 820—accommodation slot, 830—first connecting shaft, 840—second connecting shaft, 850—third connecting shaft, 910—fool—proof structure of a first shape, and 920—fool—proof structure of a second shape;

10—filament spool holder body and 20—rotary shaft of three-dimensional printing filament spool holder.

DETAILED DESCRIPTION

In order to make the above objectives, features, and advantages of the present application more clearly and easily understandable, a further detailed description of the present application will be provided in conjunction with the accompanying drawings and specific embodiments. It should be noted that the connection in the present application includes a detachable connection and a non-detachable connection. For example, the fixed connection may include a detachable fixed connection and a non-detachable fixed connection, the rotatable connection may include a detachable rotatable connection and a non-detachable rotatable connection, and the slidable connection may include a detachable slidable connection and a non-detachable slidable connection. The connection may also be direct or indirect through one component. For example, in the case of a detachable fixed connection, it means that in the mounted state, the positional relationship between at least two objects to be connected can be fixed; similarly, there are rotatable connection, slidable connection, etc.

Figure 1:
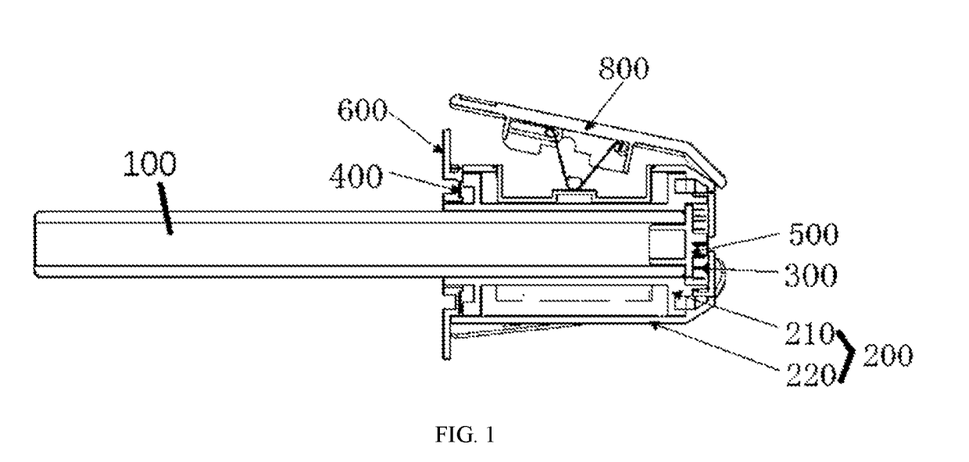
FIG. 1 is a structural schematic diagram of a rotary shaft of a three-dimensional printing filament spool holder according to the present application.

Referring to FIG. 1, a structural schematic diagram of a rotary shaft of a three-dimensional printing filament spool holder according to the present application is shown, and the rotary shaft of the three-dimensional printing filament spool holder may specifically comprise the following parts:

a fixed tube 100;

a sleeve assembly 200, wherein the sleeve assembly is sleeved outside the fixed tube 100 and is capable of rotating relative to the fixed tube 100, the sleeve assembly 200 is elastically connected to the fixed tube 100 through an elastic member 300, the relative rotation between the sleeve assembly 200 and the fixed tube 100 causes the elastic member 300 to generate elastic deformation, and the sleeve assembly 200 is configured for being sleeved in a three-dimensional printing filament spool.

In the present application, the rotary shaft of the three-dimensional printing filament spool holder comprises at least the fixed tube 100, the sleeve assembly 200, and the elastic member 300 between the fixed tube 100 and the sleeve assembly 200. The fixed tube 100 is a support foundation, and other component parts of the rotary shaft of the three-dimensional printing filament spool holder are directly or indirectly supported by the fixed tube 100. The fixed tube 100 may be mounted on a three-dimensional printer. Specifically, one end distal to the sleeve assembly 200 may be mounted on the three-dimensional printer. Specifically, the fixed tube may be mounted outside the housing of the three-dimensional printer, or may be mounted on a frame (X axis, Z axis, or Y axis) of the three-dimensional printer, or may be mounted on a filament spool holder relatively independent from the three-dimensional printer, which specifically may be the base or the holder body of the filament spool holder. The mounting of the fixed tube 100 may be a non-detachable connection or a detachable connection. The fixed tube 100 may be a solid tube member or a hollow tube member. Moreover, the material of the fixed tube 100 is not limited. In an example of the present application, the fixed tube 100 is a hollow aluminum tube.

The sleeve assembly 200 is connected to one end or two ends of the fixed tube 100, and specifically, one end of the fixed tube 100 may be one end distal to the three-dimensional printer, or the base, or a support. The sleeve assembly 200 is sleeved on the outer side surface of the fixed tube 100, and the sleeve assembly 200 is coaxial with the fixed tube 100. The sleeve assembly 200 can rotate relative to the fixed tube 100, i.e., the sleeve assembly 200 can rotate clockwise or counterclockwise on the fixed tube 100. The elastic member 300 is located between the sleeve assembly 200 and the fixed tube 100. The sleeve assembly 200 is elastically connected to the fixed tube 100 through the elastic member 300. When the sleeve assembly 200 rotates relative to the fixed tube 100, the elastic member 300 is compressed or stretched, so that the elastic member 300 generates elastic deformation. For example, when the filament spool rotates, the sleeve assembly 200 rotates relative to the fixed tube 100, and the elastic member 300 generates elastic deformation. The sleeve assembly 200 is sleeved in the three-dimensional printing filament spool, that is, the sleeve assembly 200 is sleeved in a filament spool hole of the three-dimensional printing filament spool to support and position the three-dimensional printing filament spool.

In an optional implementation of the present application, the sleeve assembly 200 comprises:

an inner cylinder assembly 210, wherein the sleeve assembly is sleeved outside the fixed tube 100 and is capable of rotating relative to the fixed tube 100, the inner cylinder assembly 210 is elastically connected to the fixed tube 100 through the elastic member 300, and the relative rotation between the inner cylinder assembly 210 and the fixed tube 100 causes the elastic member 300 to generate elastic deformation;

an outer cylinder assembly 220, wherein the outer cylinder assembly is sleeved outside the inner cylinder assembly 210 and is configured for being sleeved in the three-dimensional printing filament spool; the outer cylinder assembly 220 is capable of rotating relative to the inner cylinder assembly 210, and the outer cylinder assembly 220 and the inner cylinder assembly 210 abut against each other through an abutting member 400 to generate a frictional force for hindering the outer cylinder assembly 220 to rotate relative to the inner cylinder assembly 210.

The inner cylinder assembly 210 is sleeved on the outer edge of the fixed tube 100, and the inner cylinder assembly 210 can rotate relative to the fixed tube 100. Moreover, one end of the inner cylinder assembly 210 is elastically connected to the fixed tube 100 through the elastic member 300, that is, when the inner cylinder assembly 210 rotates relative to the fixed tube 100, the inner cylinder assembly 210 compresses the elastic member 300, so that the elastic member 300 generates elastic deformation.

In an optional implementation of the present application, a limit structure is included between the fixed tube 100 and the inner cylinder assembly 210, and the limit structure is configured for limiting the rotation angle of the inner cylinder assembly 210 relative to the fixed tube 100.

The outer cylinder assembly 220 is sleeved on the outer edge of the inner cylinder assembly 210, and the outer cylinder assembly 220 can freely rotate relative to the inner cylinder assembly 210. The outer edge of the outer cylinder assembly 220 is configured for being connected to the filament spool mounting hole to support the filament spool. That is, the filament spool can drive the outer cylinder assembly 220 to rotate. The outer cylinder assembly 220 abuts against the inner cylinder assembly 210 through the abutting member 400. When the outer cylinder assembly 220 and the inner cylinder assembly 210 rotate, the abutting member 400 generates pressure between the outer cylinder assembly 220 and the inner cylinder assembly 210, and a stiction force for hindering rotation of the outer cylinder assembly 220 relative to the inner cylinder assembly 210 is generated, so that when the filament spool drives the outer cylinder assembly 220 to rotate, the outer cylinder assembly 220 drives the inner cylinder assembly 210 to rotate relative to the fixed tube 100. When the inner cylinder assembly 210 continues to rotate, and therefore the elastic member 300 generates elastic deformation that accumulates to a certain degree or the inner cylinder assembly 210 is limited and thereby cannot rotate relative to the fixed tube, the inner cylinder assembly 210 does not rotate relative to the fixed tube 100 any more, and the outer cylinder assembly 220 starts to rotate relative to the inner cylinder assembly 210. The material of the inner cylinder assembly 210 and the outer cylinder assembly 220 is preferably a plastic material having low friction and high wear resistance, such as POM (polyoxymethylene) or nylon. The pressure of the abutting member 400 against the outer cylinder assembly 220 and the inner cylinder assembly 210 may be an axial pressure or a radial pressure. Through the friction generated by the abutting member 400 between the inner cylinder assembly 210 and the outer cylinder assembly 220, the elastic deformation of the elastic member 300 can be accumulated during feeding the filament, and the accumulated elastic deformation can be configured for driving the sleeve assembly to rotate reversely to drive the filament spool to rotate reversely.

At least one limit structure may be arranged between the fixed tube 100 and the inner cylinder assembly 210, and the limit structure may be arranged at one end of the fixed tube 100 connected to the inner cylinder assembly. The limit structure is configured for limiting the rotation angle of the inner cylinder assembly 210 relative to the fixed tube 100. Different reverse rotation (rewinding) angles/lengths can be realized by setting different angle limits by adjusting the abutting positions of the limit member and the inner cylinder assembly 210 in the circumferential direction.

Further, a plug 500 is connected to one end of the fixed tube 100, and the limit structure is included between the plug 500 and the inner cylinder assembly 210.

The plug 500 is connected to one end or two ends of the fixed tube 100, and specifically, one end of the fixed tube 100 may be one end distal to the three-dimensional printer, or the base, or a support. The plug 500 closes one end of the fixed tube 100 to position the sleeve assembly 200 on the fixed tube 100. The limit structure may be arranged between the plug 500 and the inner cylinder assembly 210. The rotation range of the inner cylinder assembly 210 is adjusted through the plug 500 and the limit structure.

In an optional implementation of the present application, the elastic member 300 comprises a torsion spring, and the sleeve assembly 200 is elastically connected to the fixed tube 100 through the elastic member 300 comprises: a first torsion arm of the torsion spring is connected to the inner cylinder assembly 210, and the body and a second torsion arm of the torsion spring are connected to the plug 500, so that the sleeve assembly 200 and the fixed tube 100 are elastically connected.

In an optional implementation of the present application, the elastic member 300 comprises a coil spring, and the sleeve assembly 200 is elastically connected to the fixed tube 100 through the elastic member 300 comprises: the inner side of the coil spring is connected to the plug 500, and the outer side of the coil spring is connected to the plug 500.

When the inner cylinder assembly 210 rotates, the coil spring is compressed, so that the coil spring generates elastic deformation, storing strength for the reverse rotation of the filament spool or the rewinding of the filament. Different rewinding strength curves can be realized by setting different coil spring thicknesses, coil numbers, widths, materials, and pre-compression angle limits. The coil spring material is preferably stainless steel or spring steel having a high fatigue life.

Further, the fixed tube 100 is in interference fit with the plug 500, or the fixed tube 100 and the plug 500 are in a fit relationship of mutually limiting rotation and mutually limiting axial movement; the fixed tube 100 is in clearance fit with the inner cylinder assembly 210, and the inner cylinder assembly 210 is in clearance fit with the outer cylinder assembly 220.

The fixed tube 100 is in interference fit with the plug 500 to fix the two relatively through a dimension relationship. The fixed tube 100 and the plug 500 are in a fit relationship of mutually limiting rotation and mutually limiting axial movement, so that the plug 500 can be fixedly connected to the fixed tube 100 without using a connector.

The fit relationship of mutually limiting axial movement of the fixed tube 100 and the plug 500 can be realized by axial buckled connection. The mutual rotation limit of the fixed tube 100 and the plug 500 can be realized by a circumferential limit connection structure.

The fixed tube 100 is in clearance fit with the inner cylinder assembly 210, and the inner cylinder assembly 210 is in clearance fit with the outer cylinder assembly 220, so that a lower frictional force can be generated between the inner cylinder assembly 210 and the fixed tube 100 and between the inner cylinder assembly 210 and the outer cylinder assembly 220, and relative rotation between the inner cylinder assembly 210 and the outer cylinder assembly 220 can be easier.

In an optional implementation of the present application, the rotary shaft of the three-dimensional printing filament spool holder further comprises:

a bottom plate 600 connected to one end of the outer cylinder assembly 220, the abutting member 400 is arranged on the bottom plate 600, the outer cylinder assembly 220 abuts against one end of the inner cylinder assembly 210, and the abutting member 400 abuts against the other end of the inner cylinder assembly 210.

The bottom plate 600 is connected to one end of the outer cylinder assembly 220, which may be the end of the outer cylinder assembly 220 distal to the plug 500. The connection between the bottom plate 600 and the outer cylinder assembly 220 may be realized by a fastener structure so as to be detachable. The outer cylinder assembly 220 abuts against one end of the inner cylinder assembly 210 to locate the outer cylinder assembly 220 on the inner cylinder assembly 210. The bottom plate 600 is provided with an abutting member 400, and the abutting member 400 abuts against the other end of the inner cylinder assembly 210, so that the abutting member 400 generates a certain pressure to provide a constant frictional force when the inner cylinder assembly 210 and the outer cylinder assembly 220 relatively rotate. The abutting member 400 may be an elastic member such as an elastic sheet, a spring sheet, a line spring, a leaf spring, or a pressure spring. In an example of the present application, the abutting member 400 is an elastic sheet, that is, a ring of an elastic sheet is mounted at an end of the bottom plate 600, and the elastic portion of the elastic sheet abuts against the inner cylinder assembly 210 to generate an axial pressure. In an optional implementation of the present application, in another optional implementation, the abutting member 400 may also be directly arranged on the inner cylinder assembly 210 or the outer cylinder assembly 220 and directly abut against the other one of the inner cylinder assembly 210 and the outer cylinder assembly 220 to generate a radial or axial pressure.

In the present application, an abutting member 400 is provided directly between the outer cylinder assembly 220 and the inner cylinder assembly 210, and the outer cylinder assembly 220 and the inner cylinder assembly 210 are connected by the abutting member 400. That is, one end of the abutting member 400 is connected to the outer cylinder assembly 220, and the other end of the abutting member 400 is connected to the inner cylinder assembly 210. The abutting member 400 is a leaf spring or a pressure spring; the elastic parameters of the leaf spring or the compression spring can be determined as required. A radial or axial pressure is generated between the outer cylinder assembly 220 and the inner cylinder assembly 210 through the abutting member 400, thereby generating a frictional force.

Figure 3:
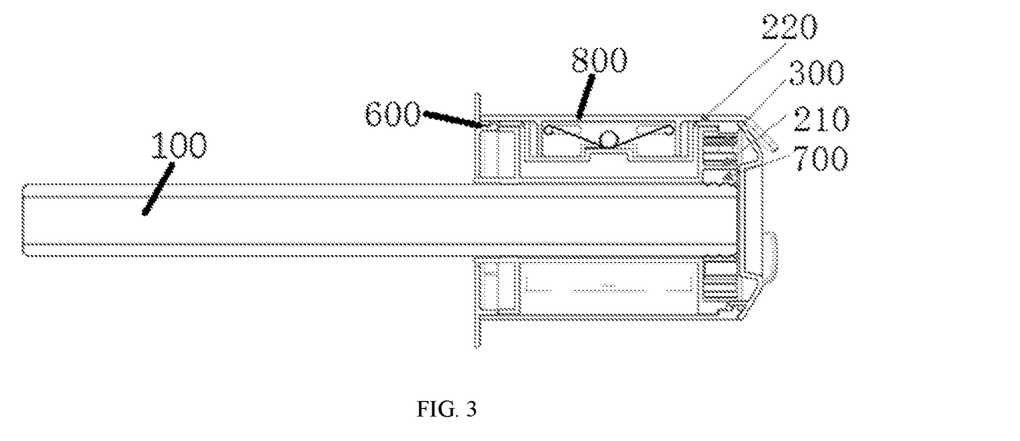
FIG. 3 is a structural schematic diagram of an elastic supporting arm module of a rotary shaft of a three-dimensional printing filament spool holder according to the present application.

In addition, referring to FIG. 3, the rotary shaft of the three-dimensional printing filament spool holder further comprises a friction assembly 700 located between the fixed tube 100 and the inner cylinder assembly 210 for providing rotational resistance between the fixed tube 100 and the inner cylinder assembly 210.

The friction assembly 700 is positioned between the fixed tube 100 and the inner cylinder assembly 210. One side of the friction assembly is connected to the fixed tube 100, and the other side is connected to the inner cylinder assembly 210. When the inner cylinder assembly 210 rotates relative to the fixed tube 100, some rotational resistance is provided.

Still further, the rotary shaft of the three-dimensional printing filament spool holder further comprises at least two elastic supporting arms 800 separately elastically mounted at the outer edge of the sleeve assembly 200 through an elastic arm 810, wherein when the elastic arm 810 is in a natural state, the elastic supporting arm 800 forms a preset included angle relative to the axial direction of the sleeve assembly 200, so that the distance between first ends of the at least two elastic supporting arms 800 is closer relative to the distance between second ends of the at least two elastic supporting arms 800, and the at least two of the elastic supporting arms 800 extend along the axial direction of the sleeve assembly 200, and are evenly distributed at the outer edge of the sleeve assembly 200 along the circumferential direction of the sleeve assembly 200, wherein the sleeve assembly 200 is sleeved outside a first end of the fixed tube 100, and a second end is the other end of the first end.

At least two elastic supporting arms 800 may be arranged on the rotary shaft of the three-dimensional printing filament spool holder. The elastic supporting arm 800 is elastically mounted at the outer edge of the sleeve assembly 200 through an elastic arm 810. The elastic supporting arm 800 rotates with the sleeve assembly 200.

Figure 5:
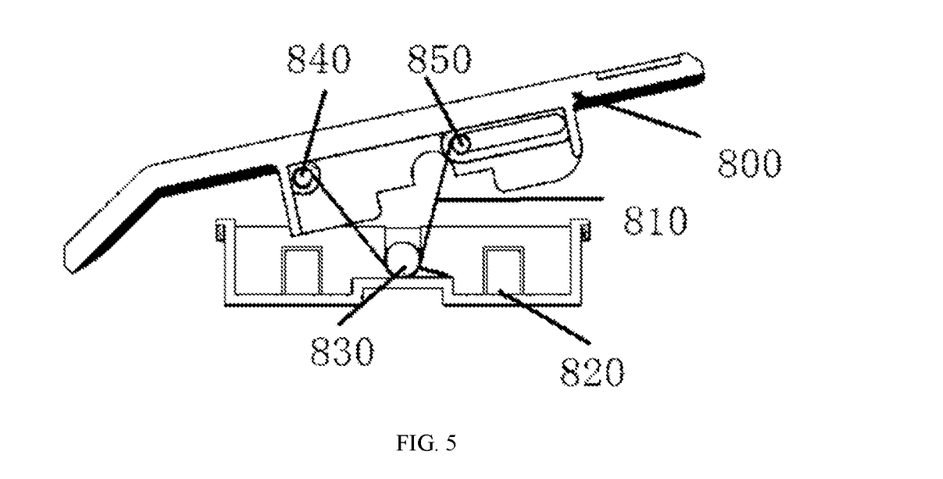
FIG. 5 is a schematic diagram of a first state of an elastic supporting arm module of a rotary shaft of a three-dimensional printing filament spool holder according to the present application.
Figure 6:
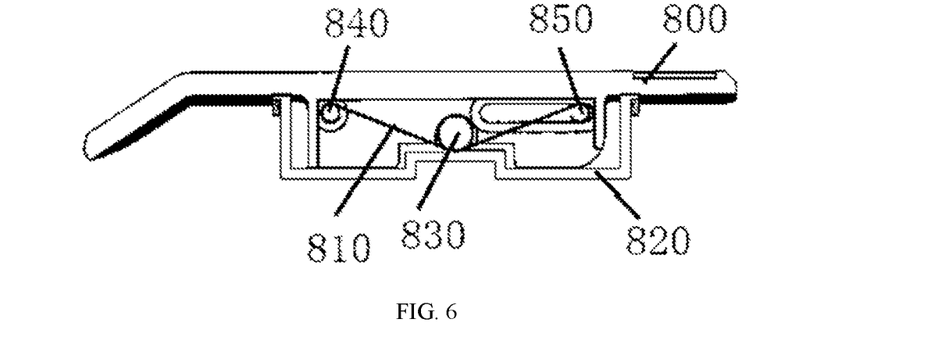
FIG. 6 is a schematic diagram of a second state of an elastic supporting arm module of a rotary shaft of a three-dimensional printing filament spool holder according to the present application.

When the elastic arm 810 is in a natural state, the elastic supporting arm 800 forms a preset included angle relative to the axial direction of the sleeve assembly 200, so that the distance between first ends of the at least two elastic supporting arms 800 is closer relative to the distance between second ends of the at least two elastic supporting arms 800, and the sleeve assembly 200 is sleeved outside a first end of the fixed tube 100, and a second end is the other end of the first end, that is, the elastic supporting arm 800 is inclined toward the side near the fixed tube 100 connected to the outside. The distance between the at least two elastic supporting arms 800 at the first end is less than the distance between the at least two elastic supporting arms 800 at the second end. It is convenient for the alignment of the center hole of the filament spool before the filament spool is mounted, so that the mounting operation of the filament spool is more convenient. As shown in FIG. 5, when the elastic supporting arm 800 is in a natural state, the elastic supporting arm 800 forms a fixed included angle relative to the axial direction of the sleeve assembly 200, which is convenient for the alignment of the center hole of the filament spool before the filament spool is mounted. As shown in FIG. 6, when the filament spool is mounted, the center hole of the filament spool pushes the supporting arm and meanwhile presses down the elastic arm 810. The elastic arm 810 deforms, so that the elastic supporting arm 800 can adapt to different diameters and cross sections of the center hole of the filament spool and provide a radial supporting force to fix the filament spool. Through the expansion state of the at least two elastic supporting arms 800, adaptive adjustment is performed to mount and guide the filament spool and fix the filament spool to be compatible with different filament spools. Compared with common sleeves having a diameter that is far less than the internal diameter of the center hole of the filament spool, the problems of stress unstability and crawling when the filament spool rotates on the filament spool holder are solved, so that the problem of the stability of extruding is influenced.

Figure 2:
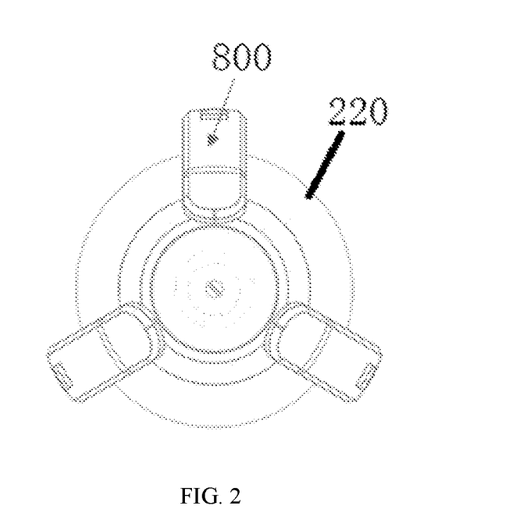
FIG. 2 is a schematic diagram of the distribution of an elastic supporting arm module of a rotary shaft of a three-dimensional printing filament spool holder according to the present application.

The at least two elastic supporting arms 800 extend along the axial direction of the sleeve assembly 200, and are evenly distributed at the outer edge of the sleeve assembly 200 along the circumferential direction of the sleeve assembly 200. Referring to FIG. 2, at least two elastic supporting arms 800 are evenly distributed at the outer edge of the sleeve assembly 200. As shown in FIG. 2, when there are three elastic supporting arms 800, the difference between every two elastic supporting arms 800 is 60 degrees, so that the elastic supporting arms are evenly distributed at the outer edge of the sleeve assembly 200.

In an optional implementation of the present application, for the sleeve assembly 200, at least two accommodation slots 820 extend along the axial direction of the sleeve assembly 200 and are distributed along the circumferential direction of the sleeve assembly 200, and the at least two supporting arms are separately mounted in the at least two accommodation slots 820; when the elastic arm 810 is in a compressed state, the at least two elastic supporting arms 800 are attached to the sleeve assembly 200.

Figure 4:
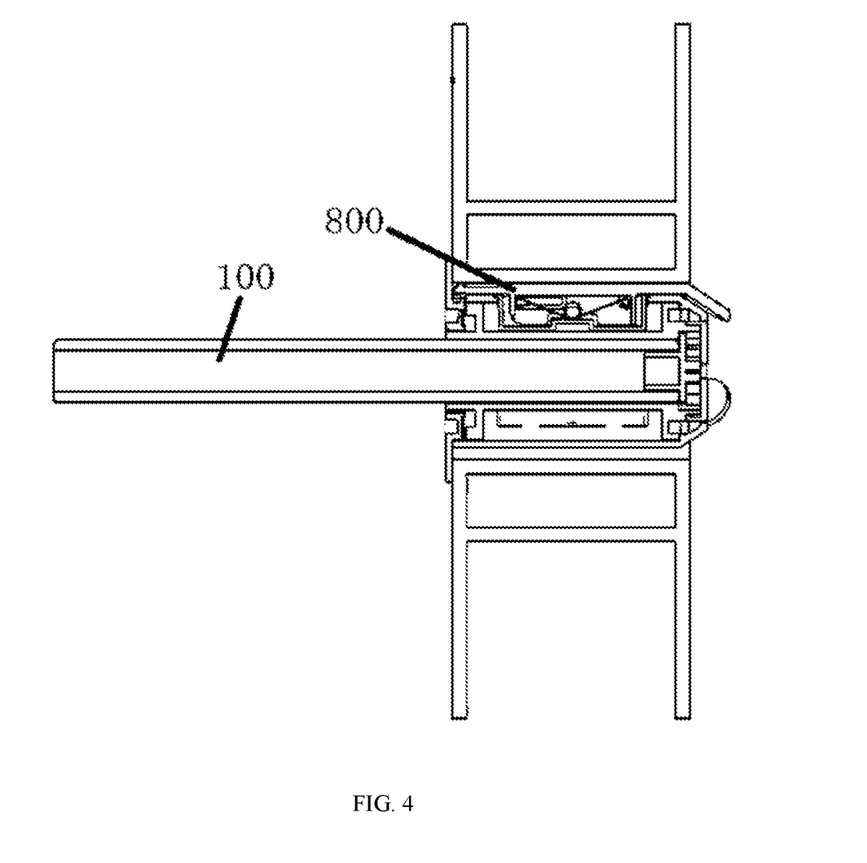
FIG. 4 is a schematic diagram of the connection between a rotary shaft of a three-dimensional printing filament spool holder according to the present application and a filament spool.

At least two accommodation slots 820 extend along the axial direction of the sleeve assembly 200 and are distributed along the circumferential direction of the sleeve assembly 200, and each accommodation slot 820 corresponds to one elastic supporting arm 800 and an elastic arm 810 thereof. Each elastic supporting arm 800 and the elastic arm 810 thereof are mounted in the corresponding accommodation slot 820, and are at least partially embedded into the accommodation slot 820 when the elastic arm 810 of each elastic supporting arm 800 is in a compressed state. Referring to FIG. 4, when the elastic arm 810 of each elastic supporting arm 800 is in the maximum compressed position of the compressed state, the elastic supporting arm 800 is completely embedded into the accommodation slot 820 and attached to the sleeve assembly 200.

Specifically, referring to FIG. 5 and FIG. 6, a mounting hole is formed in the accommodation slot 820, the elastic arm 810 comprises a leaf spring, the leaf spring has two elastic plates bent at the middle area of the leaf spring, the elastic deformation of the leaf spring is a change in the included angle between the two elastic plates, the leaf spring is provided with a middle hole in the middle area, and the leaf spring penetrates through the middle hole through a first connecting shaft 830 to connect with the mounting hole and the accommodation slot 820. The two elastic plates are configured for elastically supporting the elastic supporting arm 800.

A mounting hole is formed in the accommodation slot 820. The mounting hole is a through hole. The elastic arm 810 comprises a leaf spring, two sides of the leaf spring are respectively one of the two elastic plates, the two elastic plates are bent in the middle area of the leaf spring, and the elastic deformation of the leaf spring is a change in the included angle between the two elastic plates. For example, if the leaf spring is compressed, the elastic deformation of the leaf spring is the increase of the included angle of the two elastic plates, otherwise, when the leaf spring is released, the elastic deformation of the leaf spring is the decrease of the included angle of the two elastic plates, wherein the included angle of the two elastic plates is not more than 180 degrees.

The leaf spring is provided with a middle hole in the middle area of the leaf spring, the leaf spring can penetrate through the middle hole through the first connecting shaft 830, the two ends of the first connecting shaft 830 are inserted into the mounting hole of the accommodation slot 820, so that the middle hole of the leaf spring is connected to the mounting hole of the accommodation slot 820, and the connection between the leaf spring and the accommodation slot 820 is realized.

In addition, the elastic arm 810 may further comprise a torsion spring. The elastic supporting arm 800 and the accommodation slot 820 are connected through the torsion spring. The torsion spring may also penetrate through the body of the torsion spring through the first connecting shaft to connect with the mounting hole and the accommodation slot. The two torsion arms of the torsion spring are also configured for supporting the elastic supporting arm 800.

In an optional implementation of the present application, the elastic supporting arm 800 is provided with a round hole at one side close to the first end of the elastic supporting arm 800, a long round rail hole is arranged at one side distal to the first end of the elastic supporting arm 800, and the axial direction of the long round rail hole is parallel to the direction from the first end of the elastic supporting arm 800 to the second end of the elastic supporting arm 800; two ends of the leaf spring are provided with a side hole, the round hole is pivotally connected to one of the side holes through a second connecting shaft 840, a third connecting shaft 850 passes through the rail hole and the other of the side holes, and the third connecting shaft 850 is capable of sliding within the long round rail hole along the axial direction of the long round rail hole to change the included angle between the two elastic plates.

The round hole of the elastic supporting arm 800 is connected to the side hole at one side of the leaf spring through the second connecting shaft 840, the long round rail hole of the elastic supporting arm 800 is connected to the side hole at the other side of the leaf spring through the third connecting shaft 850, and the third connecting shaft 850 is slidably connected to the long round rail hole and slides in the long round rail hole along the axial direction of the long round rail hole to change the included angle between the two elastic plates. That is, when the leaf spring is compressed or restored, the deformation of the leaf spring drives the third connecting shaft 850 to slide in the long round rail hole, thereby changing the position of the elastic supporting arm 800. The benefit of this design lies in that, when the leaf spring is in a natural state, the elastic supporting arm 800 forms a preset included angle relative to the axial direction of the sleeve assembly 200, and along with the compression of the leaf spring pair, the included angle formed by the elastic supporting arm 800 relative to the axial direction of the sleeve assembly 200 can gradually reduce, which not only can realize the easy mounting of the filament spool, but also can realize the even stress of the filament spool fixed between the sleeve assembly when the filament spool is fixed on the sleeve assembly, thereby realizing stability. The first connecting shaft 830, the second connecting shaft 840, and the third connecting shaft 850 may be made of the same material. For example, they are all steel shafts. The second connecting shaft 840 and the third connecting shaft 850 have the same shaft diameter, so that the two elastic plates of the leaf spring are stressed similarly.

In addition, to prevent the filament spool from slipping circumferentially or axially on the supporting arm, an anti-slip member (not shown in the figure) may be provided on the outer surface of the elastic supporting arm 800 to provide a sufficient frictional force to the filament spool. The anti-slip member may be a texture, such as knurling, designed on the elastic supporting arm 800, and may also be a non-slip material such as rubber.

The process of filament feeding and filament retraction will be described so that the present application is clear to those skilled in the art.

The feeding process can successively go through two stages during feeding the filament, wherein the first stage involves elastic force increase, low friction, and limited rotation, and the second stage involves constant elastic force, high friction, and unlimited rotation. Specifically:

In the first stage, when the feeding motor drives the extrusion mechanism to draw out the filament, the filament provides a tangential pulling force to the filament spool to pull the filament spool to rotate forwards. The pressure is provided between the filament spool and the elastic supporting arm 800 by the leaf spring to generate a frictional force, so that the elastic supporting arm 800 drives the outer cylinder assembly 220 to rotate forwards, and the contact surface is always in stiction; the pressure is provided between the outer cylinder assembly 220 and the inner cylinder assembly 210 by the abutting member 400, and a relatively large frictional force is generated between the outer cylinder assembly 220 and the inner cylinder assembly 210, so that the outer cylinder assembly 220 drives the inner cylinder assembly 210 to rotate forwards, and stiction exists between the contact surfaces; between the inner cylinder assembly 210 and the fixed tube 100, since it relies only on the gravity of the filament spool to generate a frictional force, the frictional force is small, so that the inner cylinder assembly 210 rotates relative to the fixed tube 100, and sliding friction exists between the contact surfaces. As the rotation angle of the inner cylinder assembly 210 relative to the fixed tube 100 increases, the elastic force generated by the elastic member 300 gradually increases until the inner cylinder assembly 210 hits the limiting mechanism of the plug 500, at which time the elastic force of the elastic member 300 is at a maximum value and remains constant, and the inner cylinder assembly 210 starts to stop rotating. Because the feeding motor continuously draws out the filament, the filament continuously pulls the filament spool to rotate forwards continuously along the tangential direction, which enters the second stage. The outer cylinder assembly 220 and the inner cylinder assembly 210 start to rotate relatively, stiction between the contact surfaces is changed into sliding friction, and because no limit exists between the inner cylinder assembly 210 and the outer cylinder assembly 220, the outer cylinder assembly 220 can keep continuous forward rotation in the second stage.

During retracting the filament, the feeding motor loosens the filament (or drives the extrusion mechanism to reversely withdraw the filament), and at this time, because the abutting member 400 between the inner cylinder assembly 210 and the fixed tube 100 stores an elastic force, the inner cylinder assembly 210 starts to reversely rotate relative to the fixed tube 100 under the action of the elastic force, and sliding friction exists between the contact surfaces of the two. The inner cylinder assembly 210 drives the outer cylinder assembly 220 to rotate, stiction exists between the contact surfaces of the two, and finally the filament spool is driven to rotate reversely. The compatibility for the filament spool and the simplified mounting are realized, the filament retraction and rewinding are also realized, and winding is prevented. In order to ensure the realization of the above embodiment, the frictional force between the outer cylinder assembly 220 and the inner cylinder assembly 210 is greater than the frictional force between the fixed tube 100 and the inner cylinder assembly 210, and the frictional force between the outer cylinder assembly 220 and the filament spool is the largest, so that it is ensured to be always in a stiction state.

In an optional implementation of the present application, the opening of the first end of the fixed tube has a first shape, the opening of the second end of the fixed tube has a second shape, and the sleeve assembly comprises a first sleeve assembly sleeved outside the first end and a second sleeve assembly sleeved outside the second end;

the first sleeve assembly is elastically connected to the fixed tube through a first elastic member, the relative rotation between the sleeve assembly and the fixed tube causes the first elastic member to generate elastic deformation in a first direction, the first sleeve assembly has a fool-proof structure of a first shape, and the fool-proof structure of the first shape is configured for being detachably connected to the first end for the first sleeve assembly to be detachably connected to the first end;

the second sleeve assembly is elastically connected to the fixed tube through a second elastic member, the relative rotation between the sleeve assembly and the fixed tube causes the second elastic member to generate elastic deformation in a second direction, the second sleeve assembly has a fool-proof structure of a second shape, and the fool-proof structure of the second shape is configured for being detachably connected to the second end for the second sleeve assembly to be detachably connected to the second end.

Specifically, the number of the fixed tube in the present application may be one or two or more. When there are two fixed tubes, one end of the fixed tube 100 may be connected to the filament spool holder body, and one end may be connected to the sleeve assembly 200, and when there is one fixed tube, the fixed tube may pass through the filament spool holder body, and both ends may be connected to the sleeve assembly.

Specifically, the opening of the first end of the fixed tube has a first shape, the opening of the second end of the fixed tube has a second shape, and the first shape and the second shape are two different shapes. The sleeve assembly comprises a first sleeve assembly and a second sleeve assembly, the first sleeve assembly is sleeved at the outer edge of the first end of the fixed tube, and the second sleeve assembly is sleeved at the outer edge of the second end of the fixed tube. The elastic member may further comprise a first elastic member and a second elastic member.

Figure 7:
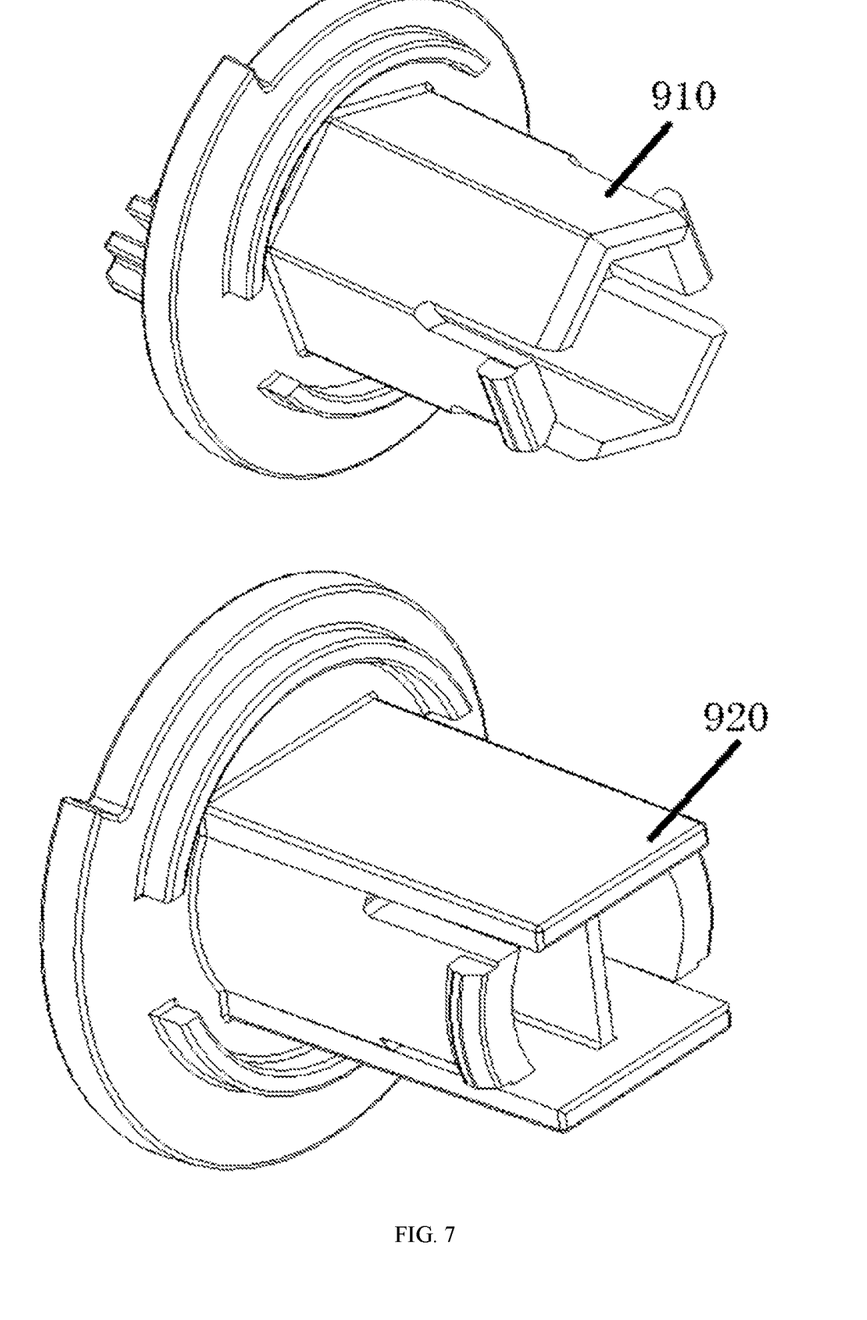
FIG. 7 is a schematic diagram of a fool-proof structure of a first shape of a rotary shaft of a three-dimensional printing filament spool holder according to the present application.

Referring to FIG. 7, the fool-proof structure 910 of the first shape has the same shape as the first shape at the opening of the first end of the fixed tube, and the dimensions are matched. The fool-proof structure 910 of the first shape is matched with the first shape at the opening of the first end, so that the fool-proof structure is detachably connected to the first end, and the first sleeve assembly and the first end of the fixed tube are detachably connected.

Figure 8:
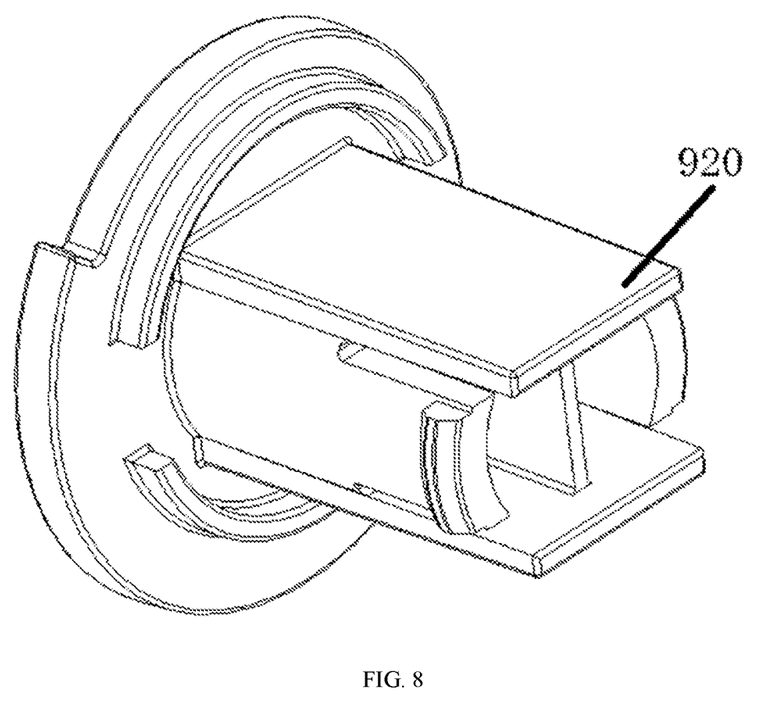
FIG. 8 is a schematic diagram of a fool-proof structure of a second shape of a rotary shaft of a three-dimensional printing filament spool holder according to the present application.

Referring to FIG. 8, the fool-proof structure 920 of the second shape has the same shape as the second shape at the opening of the second end of the fixed tube, and the dimensions are matched. The fool-proof structure 920 of the second shape is detachably connected to the second end through the second shape at the opening of the second end of the fixed tube, so that the second sleeve assembly is detachably connected to the second end of the fixed tube.

The fool-proof structure 910 of the first shape is not connectable to the second end, and the fool-proof structure 920 of the second shape is not connectable to the first end. That is, the fool-proof structure 910 of the first shape cannot be connected to the second end of the fixed tube, so that the second sleeve assembly cannot be mounted to the first end of the fixed tube. The fool-proof structure 920 of the second shape cannot be connected to the first end of the fixed tube, so that the first sleeve assembly cannot be mounted to the second end of the fixed tube.

Specifically, the first direction is a clockwise direction; the second direction is a counterclockwise direction.

In the present application, the first direction may be a clockwise direction, that is, the first sleeve assembly rotates clockwise during filament feeding. The second direction is a counterclockwise direction, and the second sleeve assembly rotates counterclockwise during filament feeding.

In addition, the first direction may also be counterclockwise, and correspondingly, the second direction is clockwise.

In an optional implementation of the present application, the fool-proof structure 910 of the first shape is configured for inserting into the opening of the first end having the first shape, and the opening of the first end having the first shape is configured for blocking the insertion of the fool-proof structure 920 of the second shape; the fool-proof structure 920 of the second shape is configured for inserting into the opening of the second end having the second shape, and the opening of the second end having the second shape is configured for blocking the insertion of the fool-proof structure 910 of the first shape.

In the present application, two groups of corresponding sleeve assemblies are respectively inserted into one end of the corresponding fixed tube through the first shape and the second shape and cannot be inserted into the other end, so that the connection fool-proof of the sleeve assemblies at two ends of the fixed tube is realized, and the assembly errors of the first sleeve assembly and the second sleeve assembly are avoided.

Further, the fool-proof structure 910 of the first shape is configured for being in buckled connection with the first end, and the fool-proof structure 920 of the second shape is configured for being in buckled connection with the second end.

In the practical application, a buckle may be mounted respectively to the first end and the second end of the fixed tube. The fool-proof structure 910 of the first shape is in buckled connection with the first end, and the fool-proof structure 920 of the second shape is in buckled connection with the second end, so that the fool-proof structure 910 of the first shape and the fool-proof structure 920 of the second shape are respectively fixedly connected at two ends of the fixed tube in a buckled manner.

In an optional implementation of the present application, the fool-proof structure 910 of the first shape comprises: a plug of the first shape; the fool-proof structure 920 of the second shape comprises a plug of the second shape. The plug of the first shape and the plug of the second shape both belong to the plug 500.

The fool-proof structure 910 of the first shape comprises the plug of the first shape, the plug of the first shape is connected to the opening of the first shape of the first end of the fixed tube at the innermost side in the circumferential direction, and the plug of the first shape is connected to the first sleeve assembly at the outer side in the circumferential direction.

The fool-proof structure 920 of the second shape comprises the plug of the second shape, the plug of the second shape is connected to the opening of the second shape of the second end of the fixed tube at the innermost side in the circumferential direction, and the plug of the second shape is connected to the second sleeve assembly at the outer side in the circumferential direction.

In an optional implementation of the present application, the insertion portion of the plug of the first shape has a fastener structure configured for being in buckled connection with the inner wall of the opening of the first end; the insertion portion of the plug of the second shape is of a fastener structure configured for being in buckled connection with the inner wall of the opening of the second end.

In an optional implementation of the present application, the insertion portion of the plug of the first shape has a fastener structure, and the fastener structure may be in buckled connection with the inner wall of the opening of the first end of the fixed tube, so that the plug of the first shape can be fixed in the axial direction of the fixed tube. The insertion portion of the plug of the second shape has a fastener structure, and the fastener structure of the plug of the second shape and the fastener structure of the plug of the first shape adopt the same buckled mode. For example, an elastic buckled mode is configured for buckling. The fastener structure of the plug of the second shape may be in buckled connection with the inner wall of the opening of the second end of the fixed tube, so that the plug of the second shape can be fixed in the axial direction of the fixed tube.

In an optional implementation of the present application, the inner wall of the opening of the first end has a female socket of the first shape configured for being in buckled fit with the insertion portion of the plug of the first shape; the inner wall of the opening of the second end has a female socket of the second shape configured for being in buckled fit with the insertion portion of the plug of the second shape.

In the practical application, the inner wall of the opening of the first end has a female socket of the first shape, and the female socket of the first shape is matched with the insertion portion of the plug of the first shape. The female socket of the first shape and the insertion portion of the plug of the first shape may be fixed to each other. The inner wall of the opening of the second end has a female socket of the second shape, and the female socket of the second shape is matched with the insertion portion of the plug of the second shape. The female socket of the second shape and the insertion portion of the plug of the second shape may be fixed to each other.

In an optional implementation of the present application, the insertion portion of the plug of the first shape comprises a first elastic arm buckle with a chamfer, and the insertion portion of the plug of the second shape comprises a second elastic arm buckle with a chamfer.

In the present application, the insertion portion of the plug of the first shape has a first elastic arm buckle with a chamfer. Through the chamfer on the first elastic arm buckle, insertion guidance is provided during inserting the insertion portion of the plug of the first shape into the inner wall buckle of the opening of the first end. The first elastic arm buckle can collide with the inner wall of the opening of the first end based on the elasticity of the elastic arm when it is fully inserted and make a sound to alert the operator that it is inserted in place.

The insertion portion of the plug of the second shape has a second elastic arm buckle with a chamfer. Through the chamfer on the second elastic arm buckle, insertion guidance is provided during inserting the insertion portion of the plug of the second shape into the inner wall buckle of the opening of the second end. The second elastic arm buckle can collide with the inner wall of the opening of the second end based on the elasticity of the elastic arm when it is fully inserted and make a sound to alert the operator that it is inserted in place.

Specifically, the first shape is a hexagon for preventing the fool-proof structure 910 of the first shape from rotating relative to the fixed tube.

In the practical application, referring to FIG. 7, the first shape is a hexagon, connection fool-proof is performed on the first sleeve assembly mounted at the first end of the fixed tube by the hexagon, and the fool-proof structure 910 of the first shape is prevented from rotating relative to the fixed tube by using the shape edge of the hexagon, so that the fool-proof structure 910 of the first shape can be fixed in the circumferential direction of the fixed tube.

Specifically, the second shape is a capsule shape for preventing the fool-proof structure 920 of the second shape from rotating relative to the fixed tube.

In the practical application, referring to FIG. 8, the first shape is a capsule shape. The capsule shape consists of two semicircular ends with a rectangle connecting the aforementioned two semicircles. Connection fool-proof is performed on the second sleeve assembly mounted at the second end of the fixed tube by the capsule shape, and the fool-proof structure 920 of the second shape is prevented from rotating relative to the fixed tube by using the capsule shape, so that the fool-proof structure 920 of the second shape can be fixed in the circumferential direction of the fixed tube.

The present application realizes that after roughly aligning the center hole of the filament spool with the rotating shaft assembly during use, it is pushed in, and the filament roll side plate contacts the bottom plate 600 to be mounted in place. At this time, the supporting arm has a radially outward elastic force, propping up the center hole of the filament roll, making the filament roll axially and circumferentially fixed relative to the rotating shaft through squeeze friction, and making the rotating shaft rotate with the filament roll, so that it can be compatible with filament spools of multiple sizes, and stress unstability and crawling on the filament spool holder affecting the stability of extruding are avoided; moreover, the first elastic member stores strength, which can eventually drive the filament spool to rotate reversely during filament retraction. The compatibility for the filament spool and the simplified mounting are realized, the filament retraction and rewinding are also realized, and winding is prevented. Moreover, fool-proof is performed by setting up openings of different shapes at two ends of the fixed tube, which can prevent the first sleeve assembly rotating in the first direction and the second sleeve assembly rotating in the second direction from assembly mistakes, thereby avoiding the filament spool reversely rotating failure during filament retraction.

Figure 9:
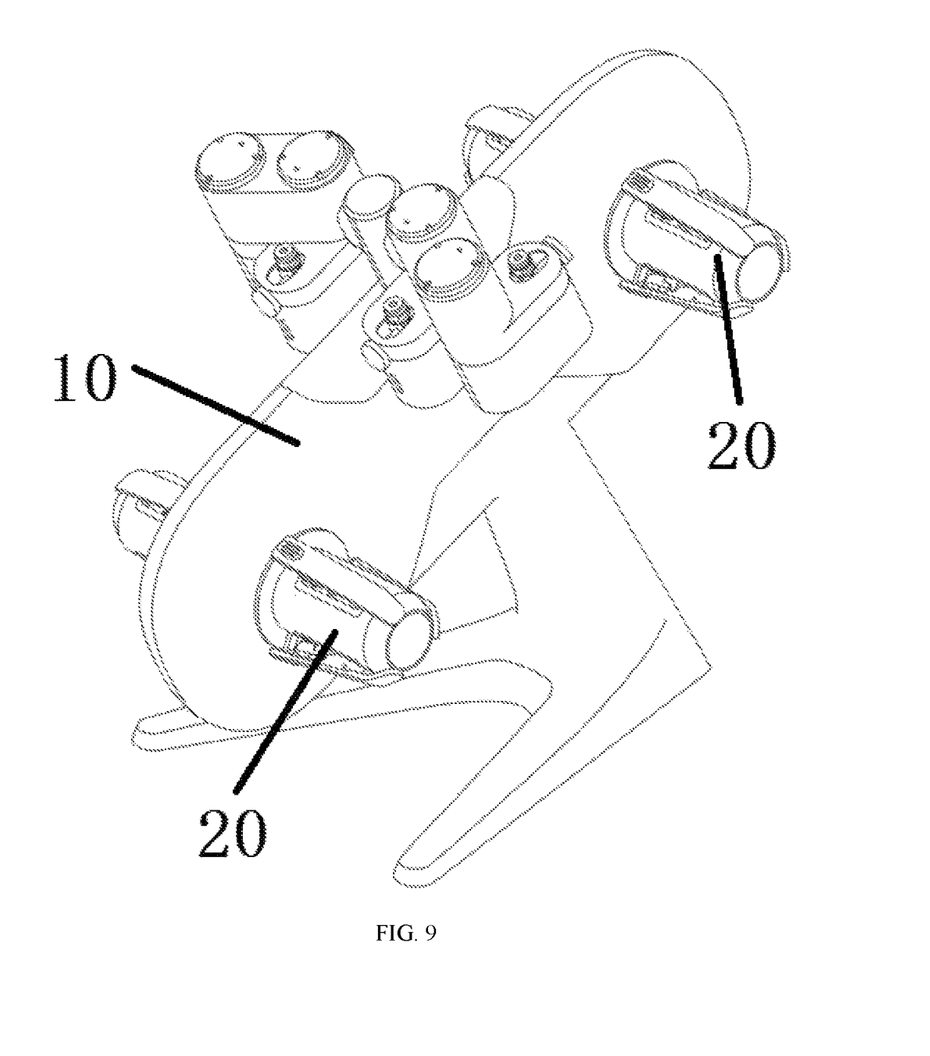
FIG. 9 is a structural schematic diagram of a three-dimensional printing filament spool holder according to the present application.

The present application further discloses a three-dimensional printing filament spool holder, comprising:
 a filament spool holder body 10;
 the rotary shaft 20 of the three-dimensional printing filament spool holder described above, wherein the fixed tube of the rotary shaft of the three-dimensional printing filament spool holder is connected to the filament spool holder body 10.

Referring to FIG. 9, the three-dimensional printing filament spool holder comprises a filament spool holder body 10 and a rotary shaft 20 of a three-dimensional printing filament spool holder, the fixed tube of the rotary shaft 20 of the three-dimensional printing filament spool holder is connected to the filament spool holder body, and the filament spool is carried by the rotary shaft 20 of the three-dimensional printing filament spool holder.

The present application further discloses a three-dimensional printing filament spool holder, wherein the three-dimensional printing filament spool holder may comprise the following parts: a filament spool holder body; a fixed tube rotatably connected to the filament spool holder body and elastically connected to the filament spool holder body through an elastic member, wherein the relative rotation between the fixed tube and the filament spool holder body causes the elastic member to generate elastic deformation; a sleeve assembly configured for being sleeved in a three-dimensional printing filament spool and capable of rotating relative to the fixed tube, wherein the sleeve assembly is configured for being sleeved in the three-dimensional printing filament spool.

Optionally, the three-dimensional printing filament spool holder further comprises: an abutting member, wherein the sleeve assembly and the fixed tube abut against each other through the abutting member to generate a frictional force for hindering the sleeve assembly to rotate relative to the fixed tube.

The filament spool holder body (for example, it may be one end of the filament spool holder body distal to the filament spool holder rotating shaft) may be mounted on the three-dimensional printer. Specifically, the filament spool holder body may be mounted outside the cavity of the three-dimensional printer, or may be mounted on a frame (X axis, Z axis, or Y axis) of the three-dimensional printer, or may be mounted on the base or the support of a filament spool holder relatively independent from the three-dimensional printer. The mounting mode may be a fixed connection.

The present application further discloses a three-dimensional printer and the rotary shaft of the three-dimensional printing filament spool holder described above, wherein one end, distal to the sleeve assembly, of the fixed tube is connected to a frame of the three-dimensional printer.

The present application further discloses a three-dimensional printer and the three-dimensional printer filament spool holder described above, wherein the filament spool holder body is connected to a frame of the three-dimensional printer.

It should be finally noted that relational terms such as first and second herein are merely used to distinguish one entity or operation from another entity or operation without necessarily requiring or implying any actual relationship or order between such entities or operations. Furthermore, the terms "comprise", "comprising", or any other variation thereof, are intended to encompass a non-exclusive inclusion, such that a process, method, article, or terminal device that includes a list of elements does not include only those elements but may include other elements not explicitly listed or inherent to such process, method, article, or terminal device. Without further limitation, an element defined by the phrase "comprising a/an . . . " does not exclude the presence of other identical elements in the process, method, article, or terminal device that includes the element.

The rotary shaft of the three-dimensional printing filament spool holder, the three-dimensional printing filament spool holder, and the three-dimensional printer provided by the present application are described in detail above. Specific examples are applied herein to explain the principle and the embodiment of the present application. The description of the examples above is only used for helping to understand the method and the core idea of the present application.

What is claimed is:

1. A rotary shaft of a three-dimensional printing filament spool holder, comprising:
 a fixed tube;
 a sleeve assembly, wherein the sleeve assembly is sleeved outside the fixed tube and is capable of rotating relative to the fixed tube, the sleeve assembly is elastically connected to the fixed tube through an elastic member, the relative rotation between the sleeve assembly and the fixed tube causes the elastic member to generate elastic deformation, and the sleeve assembly is sleeved in a three-dimensional printing filament spool; and at least two elastic supporting arms separately elastically mounted at an outer edge of the sleeve assembly through an elastic arm, wherein when the elastic arm is in a natural state, each of the at least two elastic supporting arms forms a preset included angle relative to an axial direction of the sleeve assembly, so that a distance between first ends of the at least two elastic supporting arms is closer relative to a distance between second ends of the at least two elastic supporting arms.

2. The rotary shaft of the three-dimensional printing filament spool holder according to claim 1, wherein the sleeve assembly comprises:

an inner cylinder assembly, wherein the sleeve assembly is sleeved outside the fixed tube and is capable of rotating relative to the fixed tube, the inner cylinder assembly is elastically connected to the fixed tube through the elastic member, and the relative rotation between the inner cylinder assembly and the fixed tube causes the elastic member to generate elastic deformation; and an outer cylinder assembly, wherein the outer cylinder assembly is sleeved outside the inner cylinder assembly and is used for being sleeved in the three-dimensional printing filament spool; the outer cylinder assembly is capable of rotating relative to the inner cylinder assembly, and the outer cylinder assembly and the inner cylinder assembly abut against each other through an abutting member to generate a frictional force for hindering the outer cylinder assembly to rotate relative to the inner cylinder assembly.

3. The rotary shaft of the three-dimensional printing filament spool holder according to claim 2, wherein a limit structure is included between the fixed tube and the inner cylinder assembly, and the limit structure is for limiting the rotation angle of the inner cylinder assembly relative to the fixed tube.

4. The rotary shaft of the three-dimensional printing filament spool holder according to claim 3, wherein a plug is connected to one end of the fixed tube, and the limit structure is included between the plug and the inner cylinder assembly.

5. The rotary shaft of the three-dimensional printing filament spool holder according to claim 4, wherein the elastic member comprises a torsion spring, and the sleeve assembly is elastically connected to the fixed tube through the elastic member, wherein a first torsion arm of the torsion spring is connected to the inner cylinder assembly, and a body and a second torsion arm of the torsion spring are connected to the plug.

6. The rotary shaft of the three-dimensional printing filament spool holder according to claim 4, wherein the elastic member comprises a coil spring, and the sleeve assembly is elastically connected to the fixed tube through the elastic member, wherein: an inner side of the coil spring is connected to the plug, and an outer side of the coil spring is connected to the plug.

7. The rotary shaft of the three-dimensional printing filament spool holder according to claim 4, wherein the fixed tube is in interference fit with the plug, or the fixed tube and the plug are in a fit relationship of mutually limiting rotation and mutually limiting axial movement; the fixed tube is in clearance fit with the inner cylinder assembly, and the inner cylinder assembly is in clearance fit with the outer cylinder assembly.

8. The rotary shaft of the three-dimensional printing filament spool holder according to claim 2, wherein the rotary shaft of the three-dimensional printing filament spool holder further comprises a bottom plate connected to one end of the outer cylinder assembly; and, wherein, the abutting member is arranged on the bottom plate, the outer cylinder assembly abuts against one end of the inner cylinder assembly, and the abutting member abuts against the other end of the inner cylinder assembly.

9. The rotary shaft of the three-dimensional printing filament spool holder according to claim 2, wherein the abutting member comprises an elastic sheet, a spring sheet, a leaf spring, or a pressure spring.

10. The rotary shaft of the three-dimensional printing filament spool holder according to claim 1, wherein the elastic member comprises a coil spring or a torsion spring.

11. The rotary shaft of the three-dimensional printing filament spool holder according to claim 1, wherein the at least two elastic supporting arms extend along the axial direction of the sleeve assembly, and are evenly distributed at the outer edge of the sleeve assembly along a circumferential direction of the sleeve assembly, wherein the sleeve assembly is sleeved outside a first end of the fixed tube, and a second end is the other end of the first end.

12. The rotary shaft of the three-dimensional printing filament spool holder according to claim 11, wherein at least two accommodation slots extend along an axial direction of the sleeve assembly and are distributed along a circumferential direction of the sleeve assembly, and the at least two supporting arms are separately mounted in the at least two accommodation slots; when the elastic arm is in a compressed state, the at least two elastic supporting arms are attached to the sleeve assembly.

13. The rotary shaft of the three-dimensional printing filament spool holder according to claim 12, wherein a mounting hole is formed in the accommodation slot, the elastic arm comprises a leaf spring, the leaf spring has two elastic plates bent at the middle area of the leaf spring, the elastic deformation of the leaf spring is a change in the included angle between the two elastic plates, and the leaf spring is provided with a middle hole in the middle area, and the leaf spring penetrates through the middle hole through a first connecting shaft to connect with the mounting hole and the accommodation slot.

14. The rotary shaft of the three-dimensional printing filament spool holder according to claim 13, wherein the elastic supporting arm is provided with a round hole at one side close to the first end of the elastic supporting arm, a long round rail hole is arranged at one side distal to the first end of the elastic supporting arm, and the axial direction of the long round rail hole is parallel to the direction from the first end of the elastic supporting arm to the second end of the elastic supporting arm; and two ends of the leaf spring are provided with a side hole, the round hole is pivotally connected to one of the side holes through a second connecting shaft, a third connecting shaft passes through the rail hole and the other of the side holes, and the third connecting shaft is capable of sliding within the long round rail hole along the axial direction of the long round rail hole to change the included angle between the two elastic plates.

15. The rotary shaft of the three-dimensional printing filament spool holder according to claim 11, further comprising:
an anti-slip member arranged on an outer surface of the elastic supporting arm.

16. The rotary shaft of the three-dimensional printing filament spool holder according to claim 1, wherein an opening of a first end of the fixed tube has a first shape, an opening of a second end of the fixed tube has a second shape, and the sleeve assembly comprises a first sleeve assembly sleeved outside the first end and a second sleeve assembly sleeved outside the second end;
the first sleeve assembly is elastically connected to the fixed tube through a first elastic member, the relative rotation between the sleeve assembly and the fixed tube causes the first elastic member to generate elastic deformation in a first direction, the first sleeve assembly has a fool-proof structure of a first shape, and the fool-proof structure of the first shape is used for being detachably connected to the first end for the first sleeve assembly to be detachably connected to the first end; and
the second sleeve assembly is elastically connected to the fixed tube through a second elastic member, the relative rotation between the sleeve assembly and the fixed tube causes the second elastic member to generate elastic deformation in a second direction, the second sleeve assembly has a fool-proof structure of a second shape, and the fool-proof structure of the second shape is used for being detachably connected to the second end for the second sleeve assembly to be detachably connected to the second end.

17. The rotary shaft of the three-dimensional printing filament spool holder according to claim 16, wherein the fool-proof structure of the first shape comprises: a plug of the first shape; the fool-proof structure of the second shape comprises a plug of the second shape.

18. The rotary shaft of the three-dimensional printing filament spool holder according to claim 16, wherein the first direction is a clockwise direction; the second direction is a counterclockwise direction.

19. A three-dimensional printing filament spool holder, comprising:
a filament spool holder body;
the rotary shaft of the three-dimensional printing filament spool holder according to claim 1, wherein the fixed tube of the rotary shaft of the three-dimensional printing filament spool holder is connected to the filament spool holder body.

20. A three-dimensional printing filament spool holder, comprising:
a filament spool holder body;
a bearing tube rotatably connected to the filament spool holder body and elastically connected to the filament spool holder body through an elastic member, wherein a relative rotation between the bearing tube and the filament spool holder body causes the elastic member to generate elastic deformation;
a sleeve assembly sleeved in a three-dimensional printing filament spool and capable of rotating relative to the bearing tube, wherein the sleeve assembly is sleeved in the three-dimensional printing filament spool; and
at least two elastic supporting arms separately elastically mounted at an outer edge of the sleeve assembly through an elastic arm, wherein when the elastic arm is in a natural state, each of the at least two elastic supporting arms forms a preset included angle relative to an axial direction of the sleeve assembly, so that a distance between first ends of the at least two elastic supporting arms is closer relative to a distance between second ends of the at least two elastic supporting arms.

21. The three-dimensional printing filament spool holder according to claim 20, further comprising: an abutting member, wherein the sleeve assembly and the bearing tube abut against each other through the abutting member to generate a frictional force for hindering the sleeve assembly to rotate relative to the bearing tube.

* * * * *